(12) United States Patent
Kuvaja et al.

(10) Patent No.: US 9,353,908 B2
(45) Date of Patent: May 31, 2016

(54) ADVANCED LUBRICATION SYSTEM

(75) Inventors: Jarno Kuvaja, Muurame (FI); Rauno Vehmaa, Muurame (FI); Juha Kärkkäinen, Muurame (FI); Teuvo Moilanen, Säynätsalo (FI)

(73) Assignee: AKTIEBOLAGET SKF, Gothenburg (SE)

(*) Notice: Subject to any disclaimer, the term of this patent is extended or adjusted under 35 U.S.C. 154(b) by 157 days.

(21) Appl. No.: 13/638,182

(22) PCT Filed: Mar. 18, 2011

(86) PCT No.: PCT/SE2011/000051
§ 371 (c)(1),
(2), (4) Date: Sep. 28, 2012

(87) PCT Pub. No.: WO2011/123011
PCT Pub. Date: Oct. 6, 2011

(65) Prior Publication Data
US 2013/0015019 A1    Jan. 17, 2013

(30) Foreign Application Priority Data
Apr. 1, 2010  (SE) .................................. 1000332

(51) Int. Cl.
*F16N 29/02* (2006.01)
*F16N 13/00* (2006.01)
*F16N 7/38* (2006.01)

(52) U.S. Cl.
CPC *F16N 7/38* (2013.01); *F16N 29/02* (2013.01); *F16N 2230/00* (2013.01)

(58) Field of Classification Search
CPC ........ F16N 2230/00; F16N 29/02; F16N 7/38

USPC .............................................. 184/6.4, 7.4, 26
See application file for complete search history.

(56) References Cited

U.S. PATENT DOCUMENTS

| | | | | |
|---|---|---|---|---|
| 5,646,341 A * | 7/1997 | Schricker | ............... | F01M 11/10 701/34.4 |
| 5,671,825 A * | 9/1997 | Wong et al. | ..................... | 184/6.4 |
| 5,911,289 A * | 6/1999 | Waller | ........................ | 184/103.2 |
| 5,921,350 A * | 7/1999 | Tsai | ................... | 184/6.4 |
| 6,008,724 A * | 12/1999 | Thompson | ..................... | 340/438 |
| 6,101,427 A * | 8/2000 | Yang | ............................. | 700/241 |
| 6,125,969 A | 10/2000 | Graf et al. | | |

(Continued)

FOREIGN PATENT DOCUMENTS

| | | |
|---|---|---|
| DE | 20107630 U1 | 11/2001 |
| DE | 10059797 A1 | 6/2002 |

(Continued)

*Primary Examiner* — William E Dondero
*Assistant Examiner* — Robert T Reese
(74) *Attorney, Agent, or Firm* — Bryan Peckjian; SKF USA Inc. Patent Dept.

(57) ABSTRACT

The present application relates to a lubrication system (S) comprising dosing means (1-1) for feeding lubricant to a lubrication point. The invention is based on the idea that computerized control means (1-5, 1-6) are arranged to control the operation of the lubrication system (S). The dosing means (1-1) are configured to operate responsive to a control signal provided by the control means (1-5, 1-6) to adjust the amount of lubricant to be fed by the dosing means (1-1, 1-2) to a lubrication point as required by the control means, wherein the amount of lubricant can be adjusted lubrication-point-specifically.

15 Claims, 3 Drawing Sheets

(56) References Cited

U.S. PATENT DOCUMENTS

| | | |
|---|---|---|
| 6,189,656 B1 | 2/2001 | Morgenstern et al. |
| 6,216,822 B1 * | 4/2001 | May et al. .................. 184/105.1 |
| 8,479,886 B2 * | 7/2013 | Tokuyama et al. ............ 184/6.4 |
| 8,668,050 B2 * | 3/2014 | Tokuyama et al. ............ 184/6.4 |
| 8,753,016 B2 * | 6/2014 | Matsuyama et al. .......... 384/471 |
| 2008/0308353 A1 * | 12/2008 | Aixala ............................ 184/6.5 |
| 2010/0147627 A1 * | 6/2010 | Lakomiak ........... F16C 33/6674 184/7.4 |
| 2013/0277148 A1 * | 10/2013 | Beck et al. ..................... 184/6.4 |
| 2014/0238742 A1 * | 8/2014 | Borek et al. .................... 175/40 |

FOREIGN PATENT DOCUMENTS

| | | |
|---|---|---|
| JP | S58-84294 A | 5/1983 |
| JP | H05-087293 A | 4/1993 |
| JP | H11-287395 A | 10/1999 |
| JP | 2004-076938 A | 3/2004 |
| JP | 2007-301997 A | 11/2007 |

* cited by examiner

ADVANCED LUBRICATION SYSTEM

CROSS-REFERENCE

This application is the U.S. national stage of International Application No. PCT/SE2011/000051 filed on Mar. 18, 2011, which claims priority to Swedish patent application no. 1000332-5 filed on Apr. 1, 2010, both of which are herein incorporated by Reference in their entirety.

FIELD OF THE INVENTION

The present invention relates to a lubrication system.

BACKGROUND

Oil and grease automatic lubrication systems are based on mechanical dosing and pumping components. There may be additional control and monitoring devices which control, for example, the pressure in the lubrication system or the movements of the dosers. Mechanically the components have been similar for decades.

A problem associated with the current lubrication systems is that a doser group is only able to give pre-defined dosages of lubricant. If the lubrication of a lubrication point is to be changed, it has to be carried out by mechanically adjusting the doser or by resetting the lubrication parameters from the control centre of the lubrication system.

BRIEF DESCRIPTION OF THE INVENTION

An object of the present invention is thus to provide a method, lubrication system, dosing means and control means for implementing the method so as to solve the above problem. The objects of the invention are achieved by a method and an arrangement which are characterized by what is stated in the independent claims. Preferred embodiments of the invention are disclosed in the dependent claims.

The invention is based on the idea that the lubrication system comprises lubricant dosing means that are configured to operate in response to a control signal provided by computerized control means to adjust the amount of lubricant to be fed by the dosing means to a lubrication point as required by the control means, wherein the amount of lubricant may be adjusted to be specific to the lubrication point.

An advantage of the invention is that it enables a centralized control of apparatus lubrication in order to adjust the dosage of an individual doser or a group of dosers for a selected lubrication point.

BRIEF DESCRIPTION OF THE DRAWINGS

In the following the present solution will be described in greater detail by means of preferred embodiments with reference to the accompanying drawings, in which.

DETAILED DESCRIPTION

Figure 1:
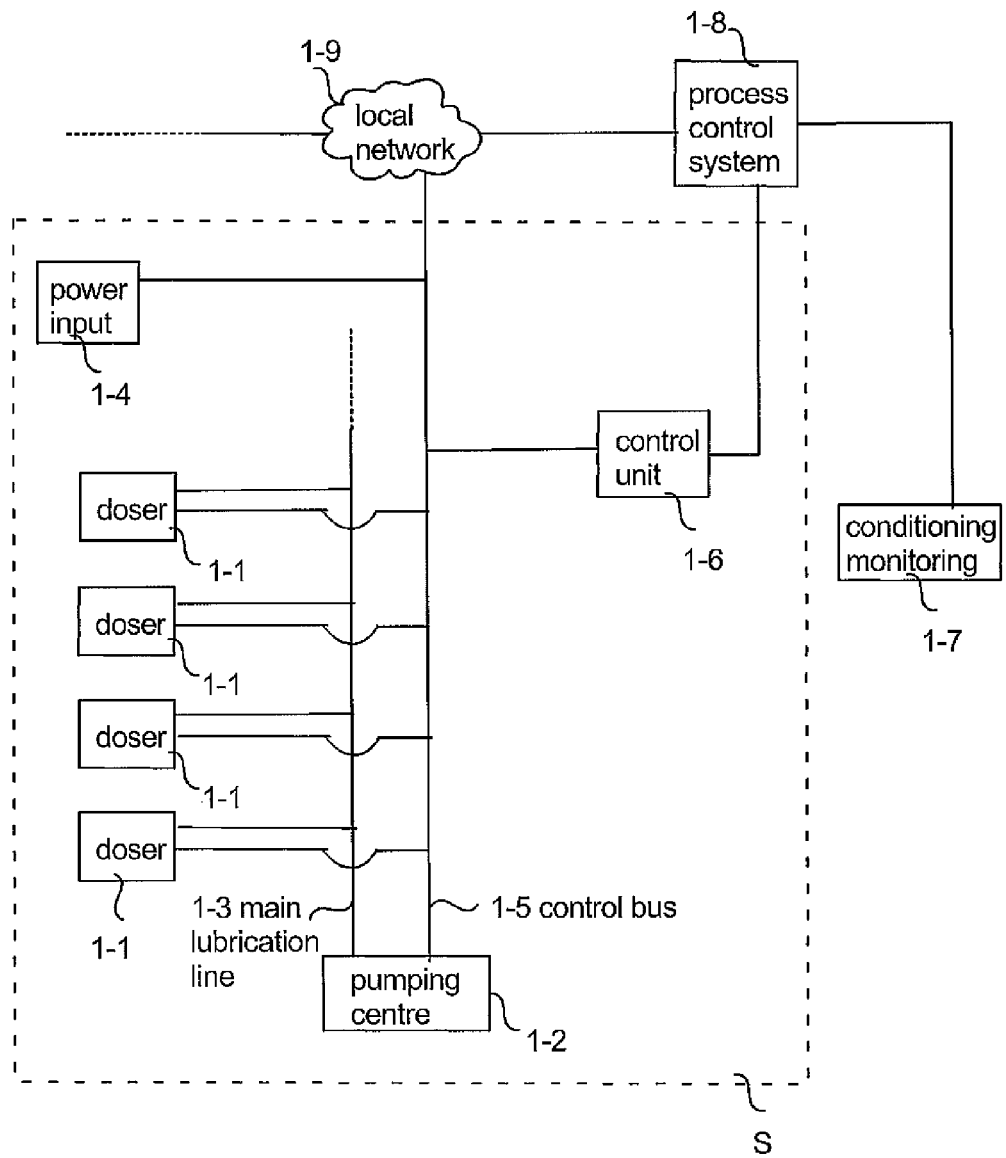
FIG. 1 illustrates a lubrication system according to an exemplary embodiment of the present solution.

A conventional lubrication system may include a divided single-, dual- or a multi-line system, the lines suggesting how many main lubrication lines there are in the system. Through the main lubrication lines the lubricant is pumped to dividers or dosers which actually divide or dose the lubricant to lubrication points. The single line systems may include systems that operate with progressive dividers or spring-operated distributors.

An exemplary dual-line automatic lubrication system may be implemented with a pressurized-air-operated barrel pump which is equipped with a lid set for different sizes of lubricant barrels, and a pressurized air regulator and service unit. There may also be a hydraulic unit, a control centre, and a pressure monitoring unit. The operation of the system may be as follows: the lubricant is pumped through the main line to doser groups. In conventional systems, the doser groups give pre-engineered and mechanically adjusted dosages to the lubrication point. The operation of the doser is based on a pressure difference between two pressurized main lines. The pressure difference between the lines is achieved by an increase and decrease of the pressure in both lines in turns. For proper operation of the system, the pressure difference may be about 50-70 bar, for example. This pressure difference affects the back pressure of the venting main line, the back pressure of the lubrication point, and the doser internal pressure loss. In conventional lubrication systems, the dosers are adjusted manually, and the adjustment controls the stroke length of the dosing piston, which affects the sizes of dosages. The dual-line system may be controlled and monitored by pressure transmitters or by switches in the main lines. The doser may be equipped with a doser monitoring unit. The whole system is controlled and monitored by a control centre (which may also be referred to as a control unit) where parameters are preset for lubrication cycle (how often the pumps start up), pressurization time (how long the pump is allowed to operate), and monitoring pressure levels in the main lines. Also the grease level in a reservoir or barrel is monitored. The control centre may be connected to the running information of the lubricated apparatus. Typically, when the apparatus is not running, the system is not lubricating, and vice versa.

The single-line automatic lubrication system may be implemented with a pressurized-air-operated barrel pump which is equipped with a lid set for different sizes of lubricant barrels, and a pressurized air regulator and service unit. There may also be a hydraulic unit, a control centre, and a pressure monitoring unit. When in operation, lubricant is pumped through the main line to the doser groups. In conventional systems, the doser groups give pre-engineered and mechanically adjusted dosages to the lubrication point. The operation of the doser is based on a pressure increase and decrease in a single main line.

What is critical in the single-line system is the pressure decreasing in the main line, because the dosers are reloaded with springs, and if the force that the residual pressure causes is greater than the spring force, the dosers are not working properly. In conventional systems, the dosers are not adjustable, and if the dosage is to be changed, it is carried out by changing the whole doser.

A progressive single-line automatic lubrication system may be implemented with a pressurized-air-operated barrel pump which is equipped with a lid set for different sizes of lubricant barrels, and a pressurized air regulator and service unit. There may also be a hydraulic unit, a control centre, and a pressure monitoring unit. The operation of the system may be as follows: lubricant is pumped through the main line to the divider groups which divide the lubricant to the lubrication point. The operation is controlled by a piston detector which analyses the movement of the piston inside the progressive divider.

The operation of the progressive divider is continuous as long as it is pressure-fed. In conventional systems, mechanically specified fixed portions are generated through the piston movements. Each piston should do a full work movement for proper operation. If some of the pistons get blocked, the whole system is soon blocked. In conventional multi-level progressive systems, the pre-engineering of the system is very important.

Exemplary embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

In an exemplary intelligent lubrication system according to the present solution there is provided a central lubrication system which has an ability to control and monitor each individual lubrication point. The controlling and monitoring is carried out by means of an intelligent doser group which is able to serve each lubrication point individually according to lubrication parameters which may be preset locally or remotely, or which may be generated on the basis of measured information. This measured information may come from e.g. conditioning monitoring or the running information of the lubricated apparatus. Lubricant may comprise e.g. lubrication oil or grease. According to an exemplary embodiment, the present solution is applicable to any divided, progressive, total-loss, single-line, dual-line and/or multi-line lubrication system. The lubricated apparatus may include e.g. a paper machine or any other apparatus or installation in which automatic lubrication is used.

FIG. 1 illustrates an intelligent lubrication system S according to an exemplary embodiment of the present solution. Components of the lubrication system S may include an intelligent doser group 1-1 (which may also be referred to as dosing means 1-1), pumping center 1-2, main lubrication line 1-3, power input 1-4, control bus 1-5, control unit 1-6, and an input and output connection to centralized process control and/or monitoring means 1-8, 1-9. The pumping centre 1-2 may include e.g. a lubricant container and one or more pumps. The centralized process control and/or monitoring means 1-8, 1-9 may be connected to conditioning monitoring 1-7 of the apparatus to be lubricated. In FIG. 1, a situation is shown where the lubrication system S comprises a group of four dosers 1-1. However, a person skilled in the art realizes that a lubrication system may include any other number of dosers 1-1. The centralized process control and/or monitoring means 1-8, 1-9 may include or may be connected to a local network, such as a local area network (LAN), wireless local area network (WLAN), Ethernet, mobile network or any other wireless or wired communications network. The centralized process control system 1-8 is capable of communicating with the control unit 1-6 and the conditioning monitoring 1-7 of the apparatus. The operation of the dosing means 1-1 may be controlled by the control unit 1-6, and/or by the centralized process control and/or monitoring means 1-8, 1-9, e.g. via the control bus 1-5.

Figure 2:
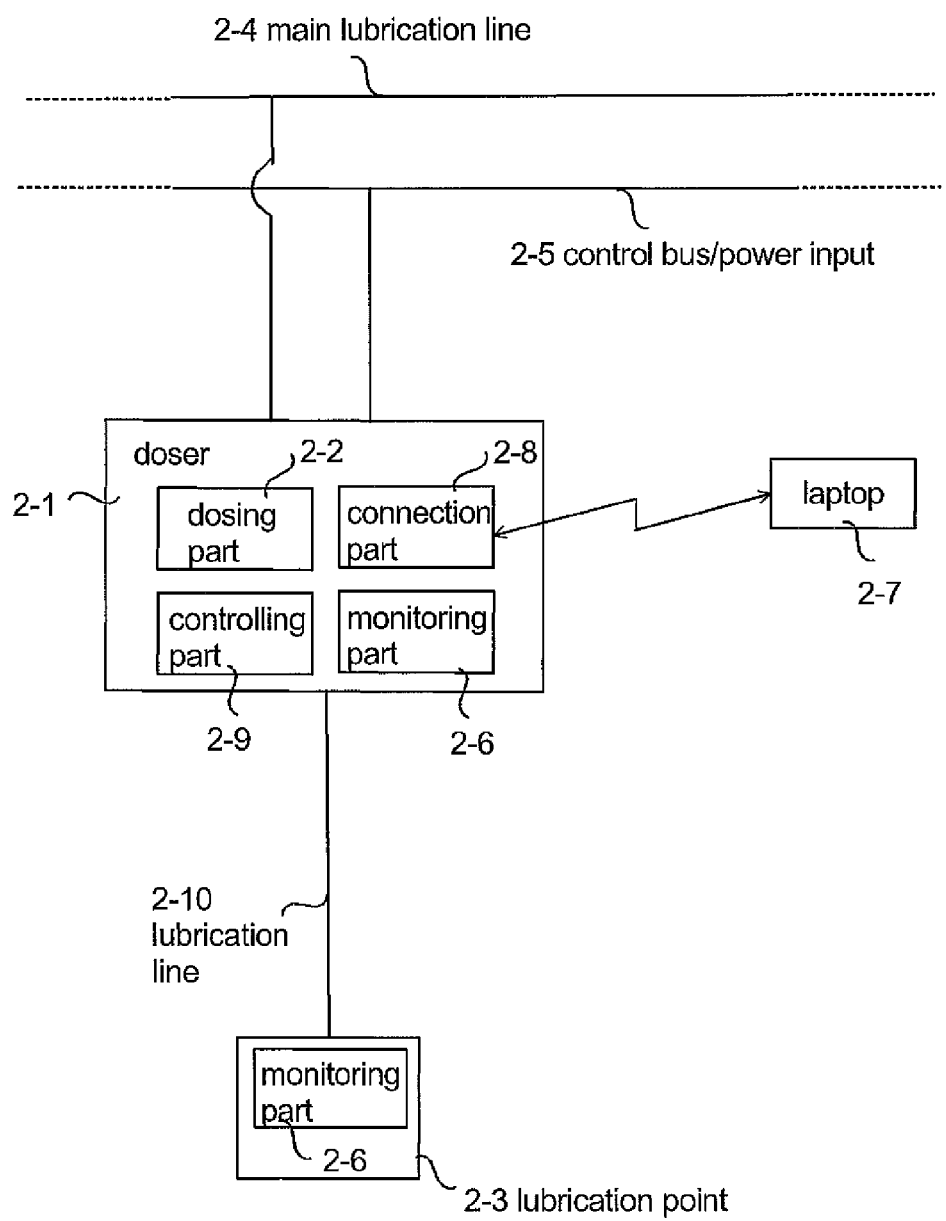
FIG. 2 illustrates a doser arrangement according to an exemplary embodiment of the present solution.

FIG. 2 illustrates an intelligent doser arrangement according to an exemplary embodiment of the present solution. Functions of the intelligent doser 2-1 may be located in the doser group (1-1 in FIG. 1) or somewhere in the lubricated apparatus. In an exemplary embodiment, the doser 2-1 includes a dosing part 2-2 for dosing lubricant to a lubrication point 2-3 (i.e. to an object of lubrication in the apparatus to be lubricated). The doser 2-1 has the necessary connections to a lubricant feeding line (i.e. the main lubrication line 2-4) and to a pumping center (1-2 in FIG. 1), and the connections 2-5 for monitoring and controlling the doser 2-1. The doser 2-1 may be equipped with a lubrication controlling part 2-9 and an internal and/or external monitoring part 2-6 which monitor the entering of lubricant via a lubrication line 2-10 to the lubrication point 2-3 (e.g. how much lubricant was entered, what was the level of viscosity of the entered lubricant, etc.). The internal monitoring part 2-6 may be integrated in or operatively connected to the doser 2-1. The external monitoring part 2-6 may be integrated in or operatively connected to the lubrication point 2-3. The controlling part 2-9 may be an integral part of the doser 2-1 or it may be detachably mounted to the doser 2-1. The doser 2-1 is arranged to operate responsive to a control signal [the control signal may include information on one or more lubrication parameters provided by the control unit (1-6 in FIG. 1) and/or the centralized process control system (1-8 in FIG. 1)] provided by the lubrication controlling part 2-9 in order to adjust the amount of lubricant to be fed by the doser 2-1 to the lubrication point 2-3. The amount of lubricant may thus be individually adjusted for the specific lubrication point 2-3. The doser may be arranged to communicate with a user terminal device 2-7 via a connection part 2-8, for receiving an input provided by a user of the system (and/or for transmitting an output to the user). The input by the user may include information on one or more lubrication parameters, and the controlling part 2-9 may be arranged to adjust the amount of lubricant fed by the dosing means 2-1 to the lubrication point 2-3 on the basis of the user input. The user terminal device 2-7 may comprise e.g. a laptop or desktop computer or a mobile device 2-7 capable of communicating with the connection part 2-8 directly or via the control bus 2-5.

Figure 3:
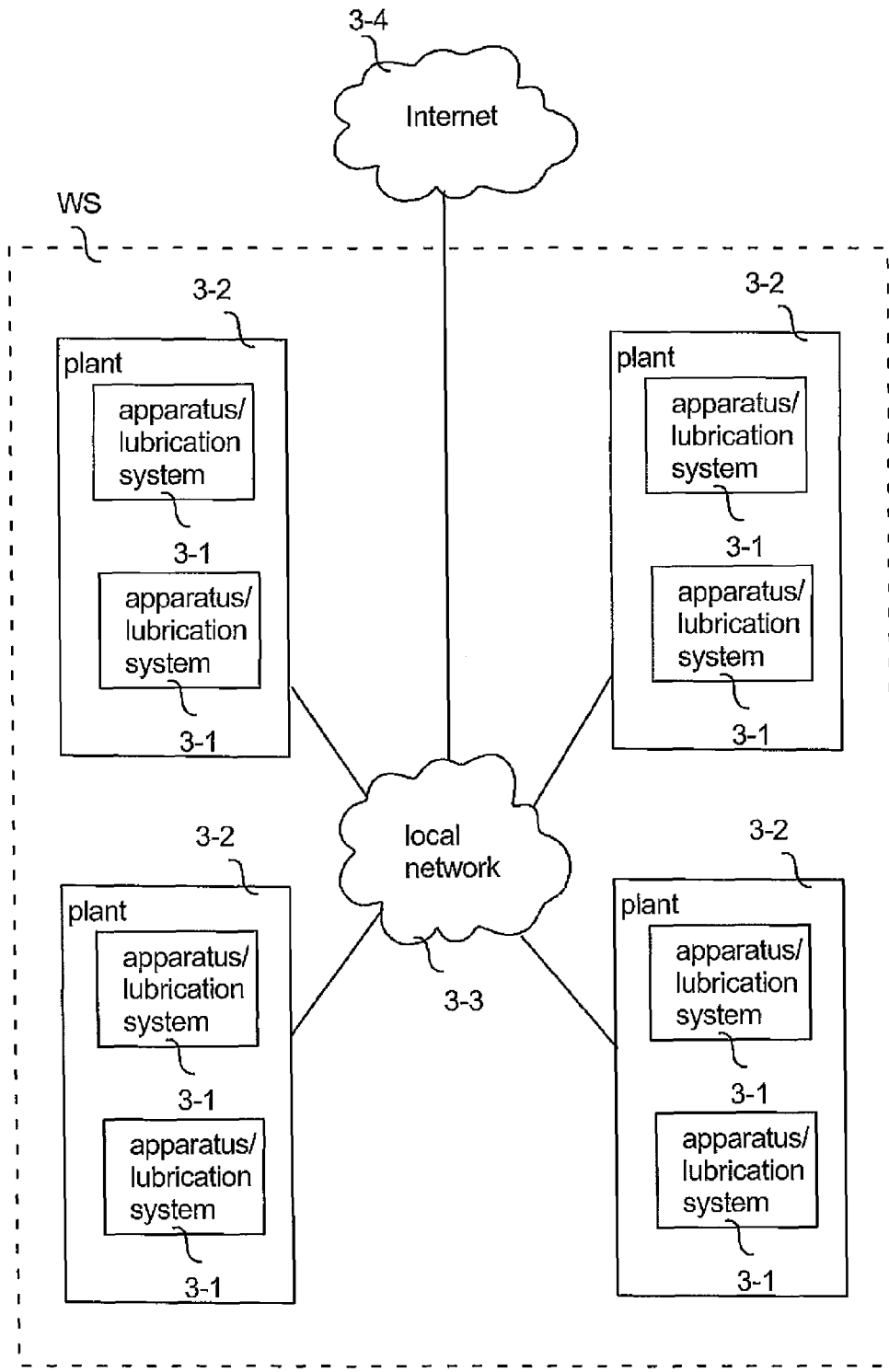
FIG. 3 illustrates a large-scale lubrication system according to an exemplary embodiment of the present solution.

FIG. 3 illustrates a large-scale lubrication system WS according to an exemplary embodiment of the present solution. In the large-scale lubrication system (which may also be referred to a mill-wide lubrication system) WS, each intelligent lubrication system 3-1 is connected to one or more centralized monitoring and controlling points 3-3 (see also FIG. 1, 1-8, 1-9) capable of providing a centralized monitoring and controlling of the lubrication of an industrial complex. In FIG. 3, a situation is shown where the large-scale lubrication system WS comprises four plants 3-2, each of which comprises two apparatuses 3-1 to be lubricated (and two lubrication systems 3-1). However, a person skilled in the art realizes that a large-scale lubrication system WS may include any other number of plants, apparatuses and/or lubrication systems. The centralized monitoring and controlling points 3-3 may be included in a local network (e.g. a local area network (LAN), wireless local area network (WLAN), Ethernet, mobile network) which may further be connected to the Internet 3-4.

By means of the present solution, the amount of lubricant fed to each lubrication point may be individually controlled in order to obtain lubrication-point-specific lubrication. The amount of lubricant fed to each lubrication point may be monitored locally or remotely. The controlling and monitoring may be carried out by means of lubrication parameters which may be locally or remotely set or which may come from measured information or from the running parameters of the lubricated apparatus. A doser may be added with intelligence (e.g. an electronic circuitry, such as an electronic circuit card) for adjusting the lubrication dosage received by a specific lubrication point. In practise, the doser may comprise e.g. a valve or some other device, the operation of which is controlled by the control means.

The lubrication system according to the present solution may be applied as a part of any existing lubrication system. Data transfer in the system, e.g. the transferring of the parameters or the measured information, may be carried out by using wireless and/or wired connections. The dosers may be arranged to operate individually and/or in a group. The changing of the parameters or the monitoring of the doser may be carried out by using wireless and/or wired connections. External monitoring devices, such as flow monitoring of the lubricant to the lubrication point, may be connected to the intelligent doser.

A control centre (i.e. a control unit 1-6) may be used in the intelligent lubrication system, e.g. if a customer is not willing to connect the intelligent doser directly to apparatus control (i.e. process control system 1-8).

The intelligent lubrication system may be connected directly to the customer process control or to the customer apparatus control. In that case, the individual lubrication points are lubricated by means of conditioning monitoring or by means of process information. This may be implemented by using wireless and/or wired connections.

The intelligent lubrication system components may include self diagnostics components, such as pressure control components in the pumping centre and in the main lines and operation monitoring components in the intelligent doser.

In an embodiment of the present solution, the lubrication system S comprises dosing means 1-1, 2-1 configured to operate responsive to a control signal provided by computerized control means 1-5, 2-5, 2-9 to adjust the amount of lubricant to be fed by the dosing means 1-1, 2-1 to a lubrication point 2-3 as required by the control means, such that the amount of lubricant is adjustable lubrication-point-specifically.

In a further embodiment of the present solution, the lubrication system is configured to adjust the amount of lubricant to be fed by the dosing means 1-1, 2-1 by adjusting the dosing rate (e.g. how many grams of lubricate per time unit (e.g. g/s)).

In a yet further embodiment of the present solution, the lubrication system is configured to adjust the amount of lubricant to be fed by the dosing means 1-1, 2-1 by adjusting the dosing interval (e.g. X dosages per hour, or 1 dosage every Yth minute).

In a yet further embodiment of the present solution, the control means are configured to control the dosing means 1-1, 2-1 to dose lubricant to a specific lubrication point 2-3 continuously, or when needed (e.g. if the condition of the apparatus so requires).

In a yet further embodiment of the present solution, the control means are configured to control the dosing means 1-1, 2-1 to dose lubricant to a specific lubrication point 2-3 continuously, or when needed (e.g. if the condition of the apparatus so requires).

In a yet further embodiment of the present solution, the lubrication system comprises a monitoring unit 2-6 for monitoring the lubrication of the respective lubrication point 2-3. The monitoring unit may be arranged to measure the pressure, temperature, viscosity, vibration and/or power of a specific lubrication point as well as the current level of lubrication of the specific lubrication point. Data on the measurements may be provided to the control means 1-5, 2-5, 2-9, and thereby the control means 1-5, 2-5, 2-9 may be configured to adjust the amount of lubricant fed by the dosing means 1-1, 2-1 to the respective lubrication point 2-3 on the basis of the measurements.

In a yet further embodiment of the present solution, the control means are configured to receive a signal input from conditioning monitoring 1-7 of the apparatus to be lubricated, the input including information on the condition of the apparatus to be lubricated. The control means 1-5, 2-5, 2-9 are configured to adjust the amount of lubricant fed by the dosing means 1-1, 2-1 to the lubrication point 2-3 on the basis of the condition of the apparatus.

In a yet further embodiment of the present solution, the control means 1-5, 2-5, 2-9 comprise means for receiving an input provided by the user of the lubrication system, the input including information on at least one lubrication parameter. The control means 1-5, 2-5, 2-9 are configured to adjust the amount of lubricant fed by the feeding means to the lubrication point 2-3 on the basis of said user input.

In a yet further embodiment of the present solution, the control means are configured to adjust the amount of lubricant fed by the dosing means 1-1, 2-1 to the lubrication point 2-3 on the basis of information on at least one production parameter of the apparatus to be lubricated (the production parameter may include e.g. the rotation speed of a bearing, or any other general production parameter).

In a yet further embodiment of the present solution, the lubrication system is configured to recognise a predetermined lubrication-related event related to a lubrication point 2-3, and adjust the amount of lubricant to be fed by the dosing means 1-1, 2-1 to the respective lubrication point 2-3 on the basis of said event. The predetermined lubrication-related event may be recognised e.g. based on the apparatus running information.

In a yet further embodiment of the present solution, the lubrication point 2-3 comprises a bearing, a sliding surface and/or a gearwheel and/or some other object of lubrication 2-3 of an apparatus.

In a yet further embodiment of the present solution, the lubrication system comprises means for adjusting the lubrication parameters of an individual lubrication point 2-3 and/or of a group of lubrication points 2-3.

In a yet further embodiment of the present solution, the lubrication system comprises means for adjusting the lubrication parameters of an individual doser 2-3 and/or of a group of dosers 2-3.

In a yet further embodiment of the present solution, the lubrication system comprises means 1-8 for connecting the lubrication system S to a large-scale lubrication system 3-3, 3-4 capable of performing a centralized monitoring and/or control of lubrication of one or more apparatuses 3-1 to be lubricated.

In a yet further embodiment of the present solution, the dosing means 1-1, 2-1 are configured to operate responsive to a control signal provided by computerized control means 1-5, 2-5, 2-9 to adjust the amount of lubricant to be fed by the dosing means 1-1, 2-1 to the lubrication point 2-3 as required by the control means, such that the amount of lubricant is adjustable lubrication-point-specifically.

In a yet further embodiment of the present solution, the computerized control means 1-5, 2-5, 2-9 are configured to control the operation of the lubrication system S by providing dosing means 1-1, 2-1 with a control signal for adjusting the amount of lubricant to be fed by the dosing means 1-1, 2-1 to a lubrication point 2-3 as required by the control means 1-5, 2-5, 2-9, such that the amount of lubricant is adjustable lubrication-point-specifically.

In a yet further embodiment of the present solution, a lubrication method comprises receiving, a control signal provided by computerized control means 1-5, 2-5, 2-9, and in response to receiving the control signal, adjusting the amount of lubricant fed by the dosing means 1-1, 2-1 to the lubrication point 2-3 as required by the control means, such that the amount of lubricant is adjustable lubrication-point-specifically.

By means of the present solution, engineering of the system becomes easier because of the size and the type of the doser used in the system (i.e. the same doser may be used for different dosage sizes; the dosage size is set during start-up). Installation of the system becomes easier because only one type of parts needs to be used. In a project place, only one type of components is necessary (compatibility). Start-up of the system becomes easier because the dosers may be re-adjusted electrically, for example, from an excel file. By means of the present solution, the need to have different doser components for different lubrication points can be eliminated or minimized, thus making the designing, offering, manufacturing, storing, mounting, and spare part service of dosers/lubrication systems significantly easier.

A benefit from the intelligent lubrication system according to the present solution is that each lubrication point may be controlled and monitored individually. This means that better lubrication at each point may be achieved, and the amount of lubricant to be used may be reduced. Also the engineering, installation, and maintenance of the lubrication system become easier. As only components of a single dosing component type are necessary, the lubricant dosage sizes may be adjusted just before start-up. As only one type of dosing components needs to be used, the whole installation may be specified to the components of that type. Start-up of the system becomes easier because the lubrication of each lubrication point may be controlled and monitored from one place. The present solution enables a continuous and an adjustable lubrication of an apparatus.

It will be obvious to a person skilled in the art that, as the technology advances, the inventive concept can be implemented in various ways. The invention and its embodiments are not limited to the examples described above but may vary within the scope of the claims.

The invention claimed is:

1. A lubrication system comprising:
dosing means configured for feeding lubricant to a lubrication point within an apparatus to be lubricated and monitored in conjunction with a monitoring part located at the lubrication point;
the dosing means are configured to operate responsive to a control signal provided by computerized control means to automatically adjust a volumetric amount of lubricant to be fed by the dosing means to the lubrication point, without requiring input from a user of the system and without requiring manual adjustment of the lubrication system by the user of the system, as required by the control means, wherein the amount of lubricant is adjustable to be specific to the lubrication point;
the control means are configured to receive a signal input from the monitoring part within the apparatus to be lubricated, the signal input including information on the condition of the apparatus to be lubricated, such that the control means are configured to adjust the amount of lubricant fed by the dosing means to the lubrication point on the basis of the condition of the apparatus as measured at the lubrication point;
means for receiving an input provided by the user of the system, the input including information on at least one lubrication parameter, wherein the control means are configured to adjust the amount of lubricant fed by the dosing means to the lubrication point on the basis of said input provided by the user as a supplement to automatic adjustment by the computerized control means of the dosing means.

2. A system as claimed in claim 1, wherein the system is configured to adjust the amount of lubricant to be fed by the dosing means by adjusting the dosing time.

3. A system as claimed in claim 1, wherein the system is configured to adjust the amount of lubricant to be fed by the dosing means by adjusting the dosing rate.

4. A system as claimed in claim 1, wherein the system is configured to adjust the amount of lubricant to be fed by the dosing means by adjusting the dosing interval.

5. A system as claimed in claim 1, wherein the control means are configured to control the dosing means to dose lubricant to a specific lubrication point continuously or when needed.

6. A system as claimed in claim 1, wherein the system further comprises a monitoring unit for monitoring the lubrication of the respective lubrication point.

7. A system as claimed in claim 1, wherein the control means are configured to receive the signal input from monitoring part of the apparatus, wherein the signal input represents at least one of a temperature measurement, a vibration measurement, and a power measurement.

8. A system as claimed in claim 1, wherein the control means are configured to adjust the amount of lubricant fed by the dosing means to the lubrication point on the basis of information on at least one production parameter of the apparatus to be lubricated.

9. A system as claimed in claim 1, wherein the system is configured to recognise a predetermined lubrication-related event related to a lubrication point, and adjust the amount of lubricant to be fed by the dosing means to the respective lubrication point on the basis of said event.

10. A system as claimed in claim 1, wherein the system further comprises means for adjusting the lubrication parameters of an individual lubrication point and/or of a group of lubrication points.

11. A system as claimed in claim 1, wherein the system further comprises means for adjusting the lubrication parameters of an individual doser and/or of a group of dosers.

12. A system as claimed in claim 1, wherein the system further comprises means for operatively connecting the lubrication system (S) to a large-scale lubrication system capable of performing a centralized monitoring and/or control of lubrication of several apparatuses to be lubricated.

13. A system as claimed in claim 1, wherein the lubrication point further comprises a bearing, a sliding surface and/or a gearwheel and/or some other object of lubrication of the apparatus.

14. A lubrication system comprising:
a doser for supplying lubricant to a device,
a control system configured to provide a signal to the doser representative of the lubrication required by the device,
a monitor configured to provide a signal representative of a lubricating condition of the doser and an operating condition of the device to the control system, wherein
the control system is configured to interpret the lubricating condition of the doser and the operating condition of the device to, if necessary, automatically adjust the lubrication supply to the device, the control system also being configured to receive an input from a user and adjust the lubrication supply to the device based on the user.

15. A lubrication method for a system having a doser for feeding lubricant to a lubrication point within an apparatus, wherein the method comprises:
   receiving, in the doser, a control signal provided by a control system, the control system being capable of controlling the lubrication system;
   monitoring by the control system of a parameter of a condition of the apparatus at the lubrication point, wherein the control system adjusts the control signal to automatically adjust a volumetric amount of lubricant to be dispensed by the doser based on the parameter of the apparatus at the lubrication point such that the control system is configured to automatically adjust the volumetric amount of lubricant fed by the doser to the lubrication point on the basis of the condition of the apparatus,
   monitoring by the control system for input from a user, wherein the control system is also capable of adjusting the control signal to adjust the volumetric amount of lubricant to be dispensed by the doser based on the input by the user,
   in response to receiving the control signal, adjusting the volumetric amount of lubricant to be fed by the doser to the lubrication point within the apparatus.

* * * * *